US006993269B2

(12) United States Patent
Yamauchi et al.

(10) Patent No.: US 6,993,269 B2
(45) Date of Patent: Jan. 31, 2006

(54) IMAGE FORMING APPARATUS, IMAGE PROCESSING APPARATUS, IMAGE FORMING METHOD AND IMAGE PROCESSING METHOD FOR FORMING/PROCESSING A THREE-DIMENSIONAL IMAGE

(75) Inventors: Yasuki Yamauchi, Kanagawa (JP); Kunio Yamada, Kanagawa (JP); Takashi Yamamuro, Kanagawa (JP); Makoto Hirota, Kanagawa (JP); Akira Ishii, Kanagawa (JP); Toru Misaizu, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 49 days.

(21) Appl. No.: 10/385,688

(22) Filed: Mar. 12, 2003

(65) Prior Publication Data

US 2004/0037589 A1 Feb. 26, 2004

(30) Foreign Application Priority Data

Aug. 20, 2002 (JP) ............................ P2002-239886

(51) Int. Cl.
*G03G 15/22* (2006.01)
(52) U.S. Cl. ...................... 399/130; 399/223; 399/298; 399/411
(58) Field of Classification Search ................. 399/53, 399/130, 183, 194, 223, 252, 298, 411, 299; 430/45, 126; 283/94, 114, 117; 347/115, 347/117
See application file for complete search history.

(56) References Cited

U.S. PATENT DOCUMENTS

| 4,459,344 A | * | 7/1984 | Jacob ........................... 430/97 |
| 4,843,426 A | * | 6/1989 | Levine ........................ 399/184 |
| 4,871,408 A | * | 10/1989 | Honma et al. ................. 156/83 |
| 5,231,450 A | * | 7/1993 | Daniels ........................ 355/27 |
| 6,165,667 A | * | 12/2000 | Takagi et al. ............. 430/110.2 |
| 6,708,012 B2 | * | 3/2004 | Misaizu et al. ............. 399/130 |

FOREIGN PATENT DOCUMENTS

| EP | 765763 A2 | * | 4/1997 |
| JP | 56167156 A | * | 12/1981 |
| JP | 2001134091 A | * | 5/2001 |
| JP | A 2001-134006 | | 5/2001 |

* cited by examiner

*Primary Examiner*—Robert Beatty
(74) *Attorney, Agent, or Firm*—Oliff & Berridge, PLC

(57) ABSTRACT

In an image processing section, a foam toner signal generator generates a foam toner signal corresponding to a foam toner amount to be transferred to a three-dimensional print designation region discriminated at a three-dimensional print region discriminator, and a foam toner interpolation signal generator generates a foam toner interpolation signal corresponding to a foam toner amount to be transferred to an image region equal to or greater than a constant area in an ordinary print region discriminated at the three-dimensional print region discriminator. Foam toner of a predetermined amount corresponding to the foam toner signal is transferred to the three-dimensional print region, and foam toner of an amount that is less (of a lower height) than the predetermined amount and corresponds to the foam toner interpolation signal is transferred to the ordinary print region.

13 Claims, 8 Drawing Sheets

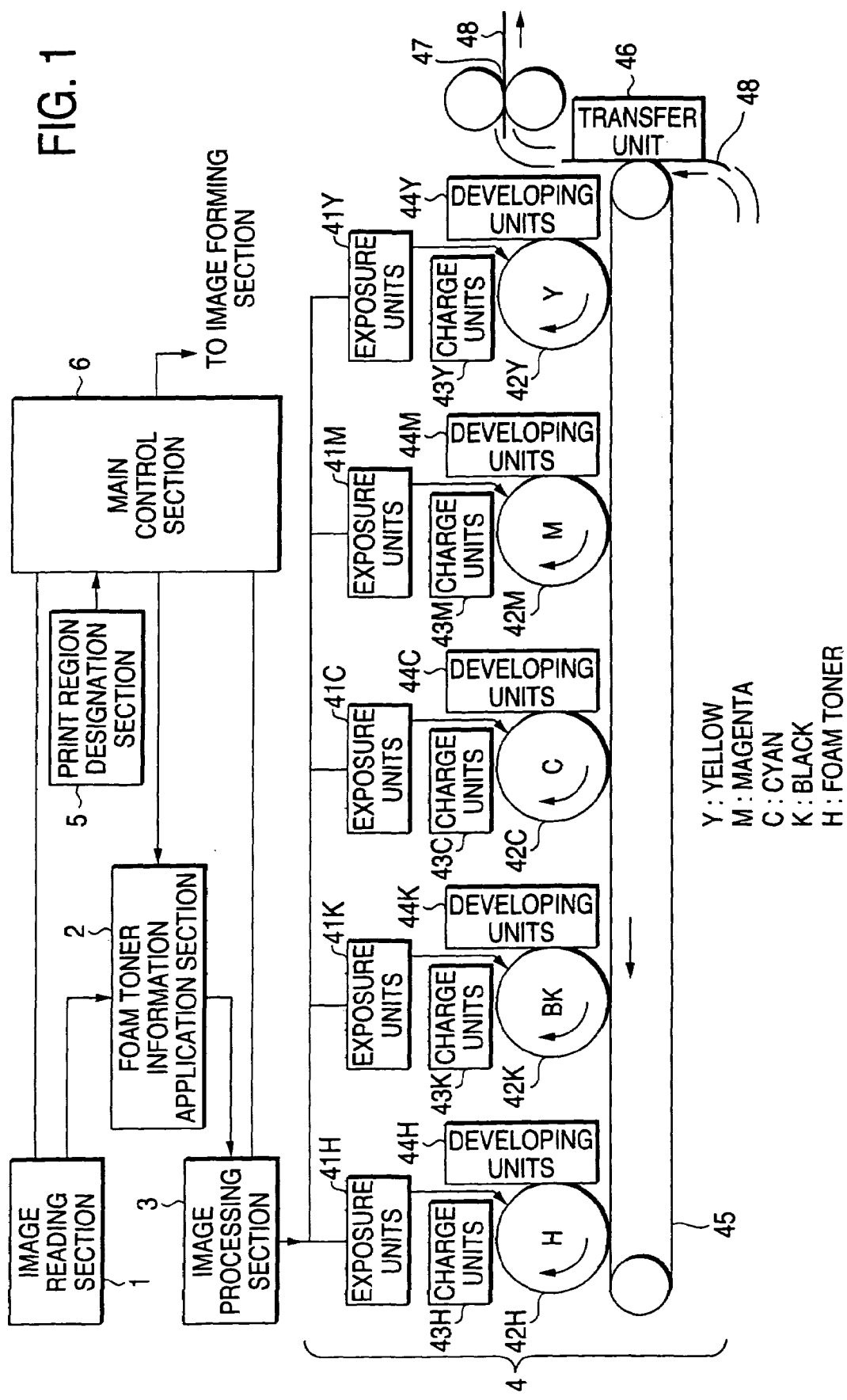

TRANSFER PROCESS (Y)

TRANSFER PROCESS (M)

TRANSFER PROCESS (C)

TRANSFER PROCESS (K)

TRANSFER PROCESS (H)

SECONDARY TRANSFER PROCESS

FIXING PROCESS

IMAGE FORMING APPARATUS, IMAGE PROCESSING APPARATUS, IMAGE FORMING METHOD AND IMAGE PROCESSING METHOD FOR FORMING/PROCESSING A THREE-DIMENSIONAL IMAGE

BACKGROUND OF THE INVENTION

1. Field of the Invention

The present invention relates to an image forming apparatus, such as a printer or copying machine that applies an electrophotographic process or an electrostatic recording process and forms a three-dimensional image using foam toner, an image processing apparatus, an image forming method, and an image processing method, and in particular to an image forming apparatus, an image processing apparatus, image forming method, and an image processing method that have an image processing function of making differences in coloration between a case where an ordinary color image is formed and a case where a color image is formed on foam toner inconspicuous.

2. Description of the Related Art

Conventionally, it has been common to use image forming apparatus, such as electrophotographic and electrostatic recording printers and copying machines, in order to two-dimensionally form on a recording medium, such as recording paper, an image, such as black-and-white or full color characters and figures or photographs, to visually recognize the image formed on the recording medium, and to transmit desired information.

With respect thereto, if image information can be expressed three-dimensionally, there is the effect of increasing the sense of actuality and the sense of realism, and it also becomes possible to utilize haptic information.

The techniques disclosed in Japanese Patent Application No. 10-304458 and in JP-A-2001-134006 are known as techniques that carry out three-dimensional printing by an electrophotographic process as character information, such as Braille, and image information, such as a map showing topography.

In the methods for forming a three-dimensional image disclosed in these publications, a three-dimensional image is formed by, for example, disposing a toner image including coloring materials of predetermined colors on a foam toner image in an electrophotographic recording process, causing the foam toner image to foam by applying heat thereto in a fixing step, and melting and adhering the respective color toner images that have been disposed thereon.

In a case where a color image is formed on a recording medium by an ordinary method, toners of predetermined colors are melted and adhered onto the recording medium in accordance with image information, and the multicolor toners are mixed and fixed as a color image, and the image is always formed two-dimensionally on the recording medium because foam toner is not disposed at a base portion.

When comparing the color image formed on the recording medium by the above-described ordinary method (forming an ordinary print region) with the case where a three-dimensional color image formed on a recording medium by fixing respective color toners on foam toner is formed (forming a three-dimensional print region), because the color image of the ordinary print region is flat and the color image of the three-dimensional print region projects on the recording medium, differences in coloration arise on the surface thereof. In particular, the tendency for granularity to worsen in the three-dimensional print region is remarkable in comparison with the ordinary print region.

In the conventional image forming apparatus, because the color image of the ordinary print region is always formed two-dimensionally in contrast to the color image that is formed three-dimensionally in the three-dimensional print region, there has been the problem that differences arise in coloration between the color images of both print regions when the ordinary print region and the three-dimensional print region are mixed, which leads to low image quality tone.

SUMMARY OF THE INVENTION

It is an object of the present invention to provide an image forming apparatus and an image forming method that eliminate the above-described problem and eliminate differences in coloration between color images of both print regions as much as possible when an ordinary print region and a three-dimensional print region are mixed, and with which excellent print image quality can be obtained.

In order to achieve this object, according to one aspect of the invention, there is provided an image forming apparatus that forms a three-dimensional print image by forming an image with a three-dimensional material on a recording medium in correspondence to image information and forming an image on the image with a coloring material, the image forming apparatus including: designation means that designates, with respect to the image information, a distinction between a non-three-dimensional print region and a three-dimensional print region using the three-dimensional material; and image forming means that forms, when the three-dimensional material is to be formed at both of the non-three-dimensional print region and the three-dimensional print region designated by the designation means, an image in which the amount per unit area of the three-dimensional material of the three-dimensional print region becomes larger in comparison with the three-dimensional material of the non-three-dimensional print region.

According to another aspect of the invention, there is provided an image forming apparatus that forms a three-dimensional print image by forming an image with a three-dimensional material on a recording medium in correspondence to image information and forming an image on the image with a coloring material, the image forming apparatus including: designation means that designates, with respect to the image information, a distinction between a non-three-dimensional print region and a three-dimensional print region using the three-dimensional material; and image forming means that forms, at the non-three-dimensional print region designated by the designation means, an image with the three-dimensional material of a predetermined amount per unit area, and forms, at the three-dimensional print region, an image with the three-dimensional material of an amount corresponding to the image information.

According to still another aspect of the invention, there is provided an image processing apparatus that processes image information in order to form a three-dimensional print image by forming an image with a three-dimensional material on a recording medium and forming an image on the image with a coloring material, the image processing apparatus including: image processing means for carrying out image processing of the image information such that, when the three-dimensional material is to be formed at both of a non-three-dimensional print region and a three-dimensional print region in correspondence to a designation of the non-three-dimensional print region and the three-dimensional print region with respect to the image information, the amount per unit area of the three-dimensional material of the three-dimensional print region becomes larger in comparison with the three-dimensional material of the non-three-dimensional print region.

According to still another aspect of the invention there is provided an image processing apparatus that processes image information in order to form a three-dimensional print image by forming an image with a three-dimensional material on a recording medium and forming an image on the image with a coloring material, the image processing apparatus including: image processing means for carrying out image processing of the image information such that, in correspondence to a designation of a non-three-dimensional print region and a three-dimensional print region with respect to the image information, an image is formed at the non-three-dimensional print region with the three-dimensional material of a predetermined amount per unit area and an image is formed at the three-dimensional print region with the three-dimensional material of an amount corresponding to the image information.

According to still another aspect of the invention, there is provided an image forming method that forms a three-dimensional print image by forming an image with a three-dimensional material on a recording medium in correspondence to image information and forming an image on the image with a coloring material, the image forming method including: designating, with respect to the image information, a distinction between a non-three-dimensional print region and a three-dimensional print region using the three-dimensional material; and forming, when the three-dimensional material is to be formed at both of the non-three-dimensional print region and the three-dimensional print region, an image in which the amount per unit area of the three-dimensional material of the three-dimensional print region becomes larger in comparison with the three-dimensional material of the non-three-dimensional print region.

According to still another aspect of the invention, there is provided an image forming method that forms a three-dimensional print image by forming an image with a three-dimensional material on a recording medium in correspondence to image information and forming an image on the image with a coloring material, the image forming method including: designating, with respect to the image information, a distinction between a non-three-dimensional print region and a three-dimensional print region using the three-dimensional material; and forming, at the non-three-dimensional print region, an image with the three-dimensional material of a predetermined amount per unit area, and forming, at the three-dimensional print region, an image with the three-dimensional material of an amount corresponding to the image information.

According to still another aspect of the invention, there is provided an image processing method that processes image information in order to form a three-dimensional print image by forming an image with a three-dimensional material on a recording medium and forming an image on the image with a coloring material, the image processing method including: designating a distinction between a non-three-dimensional print region and a three-dimensional print region with respect to the image information; and carrying out image processing of the image information such that, when the three-dimensional material is to be formed at both of the non-three-dimensional print region and the three-dimensional print region, the amount per unit area of the three-dimensional material of the three-dimensional print region becomes larger in comparison with the three-dimensional material of the non-three-dimensional print region.

According to still another aspect of the invention, there is provided an image processing method that processes image information in order to form a three-dimensional print image by forming an image with a three-dimensional material on a recording medium and forming an image on the image with a coloring material, the image processing method including: designating a distinction between a non-three-dimensional print region and a three-dimensional print region; and carrying out image processing of the image information such that an image is formed at the non-three-dimensional print region with the three-dimensional material of a predetermined amount per unit area and an image is formed at the three-dimensional print region with the three-dimensional material of an amount corresponding to the image information.

BRIEF DESCRIPTION OF THE DRAWINGS

FIG. 1 is a block diagram illustrating the structures of main sections of an image forming apparatus pertaining to the invention;

DETAILED DESCRIPTION OF THE PREFERRED EMBODIMENTS

Figure 2A:
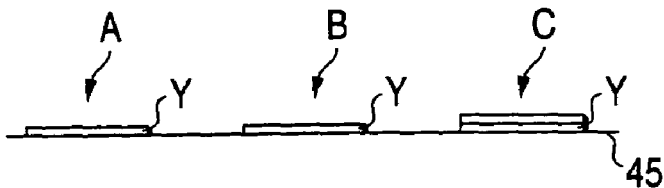
FIGS. 2A to 2G are conceptual cross-sectional structural diagrams of toner images for describing a transfer and fixing process.
Figure 2B:
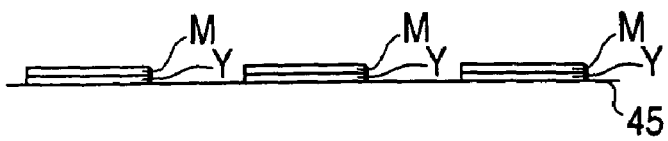
Figure 2C:
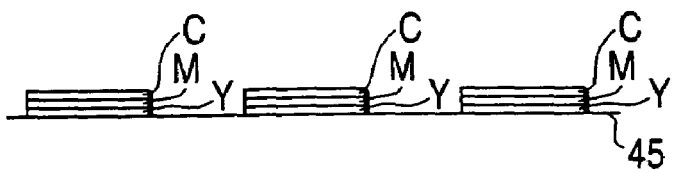
Figure 2D:
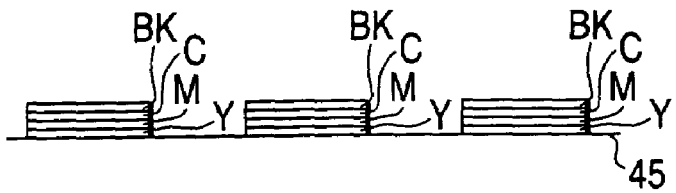
Figure 2E:
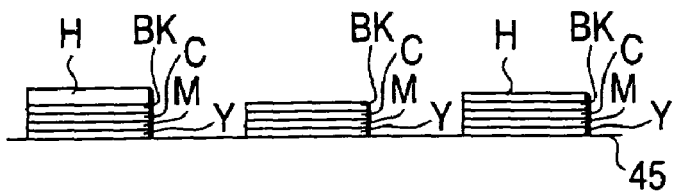

Now, a description will be given in more detail of preferred embodiments of the invention with reference to the accompanying drawings.

Embodiments of the present invention will be described in detail below with reference to the attached drawings.

FIG. 1 is a block diagram illustrating the structures of main sections of an image forming apparatus pertaining to the invention.

The image forming apparatus is used as a copying machine and is structured by: an image reading section 1 that reads an image on an original; a foam toner information application section 2 that applies foam toner information to pixels of a three-dimensional print designation region in the image information read at the image reading section 1; an image processing section 3 that carries out image processing for varying the amount of foam toner transferred to the three-dimensional print designation region and to an ordinary print region with respect to the image information to which the foam toner information has been applied; an image forming section 4 that forms an ordinary print image or a three-dimensional print image in correspondence to print image information generated by image processing; a print region designation section 5 that designates the three-dimensional print region and the ordinary print region; and a main control section 6 that carries out control of the entire apparatus.

The image reading section 1 uses a light source to illuminate an original placed on a platen glass, scan-exposes a light image reflected from the original via a reducing optical system onto an image reading element comprising a CCD or the like, and uses the image reading element to read a coloring material reflected light image of the original at a predetermined dot density (e.g., 16 dots/mm).

The coloring material reflected light image of the original read at the image reading section 1 is sent to the image processing section 3 as original reflectance data of the three colors of red (R), green (G), and blue (B) (each being 8 bits).

At that time, of the ordinary print designation region and the three-dimensional print designation region designated from the print region designation section 5, the foam toner information application section 2 applies foam toner information to the original reflectance data with respect to the pixels of the three-dimensional print designation region.

It should be noted that the foam toner information comprises flag information for which a value of "1" is set when foam toner is used and a value of "0" is set when foam toner is not used.

The image processing section 3 imports the original reflectance data sent from the foam toner information application section 2, administers predetermined image processing with respect to the original reflectance data, such as shading correction, positional displacement correction, color space conversion, gamma correction, border erasure, and color/movement editing, and generates original coloring material tone data of the four colors of yellow (Y), magenta (M), cyan (C), and black (BK) (each being 8 bits).

The image processing section 3 also checks whether or not the foam toner information has been applied per target pixel in the original reflectance data and, depending on whether or not the foam toner information has been applied, generates a foam toner signal or a foam toner interpolation signal that determines the amount of foam toner with respect to the target pixels. The image processing section 3 also synthesizes the foam toner signal or the foam toner interpolation signal (foam toner tone data) with the original reflectance data of the four colors and sends it to the image forming section 4.

The image forming section 4 is image forming means that is capable of forming a foam toner (H) image along with toners (ordinary toners: non-foam toners) of the four colors of yellow (Y), magenta (M), cyan (c), and black (BK), and is disposed with: exposure units 41Y, 41M, 41C, 41BK, and 41H that respectively carry out image exposure with a laser in correspondence to each color toner and foam toner; photosensitive drums 42Y, 42M, 42C, 42BK, and 42H that serve as image carriers on which an electrostatic latent image is formed; charge units 43Y, 43M, 43C, 43BK, and 43H that charge the photosensitive drums 42Y, 42M, 42C, 42BK, and 42H before the electrostatic latent images are formed thereon; and developing units 44Y, 44M, 44C, 44BBK, and 44H that develop the electrostatic latent images formed on the photosensitive drums 42Y, 42M, 42C, 42BK, 42H to form the foam toner image or the plural toner images of different colors.

Moreover, the image forming section 4 includes: an intermediate transfer belt 45 that multiply transfers (primary transfer) the foam toner image and the toner images of the four colors developed at the developing units 44Y, 44M, 44C, 44BK, and 44H; a transfer unit 46 that transfers (secondary transfer) to recording paper 48 the toner images that have been multiply transferred to the intermediate transfer belt 45; and a fixing unit 47 that fixes the toner images on the recording paper 48 to which the toner images have been transferred by the transfer unit 46.

The foam toner tone data and the original coloring material tone data of the four colors of yellow (Y), magenta (M), cyan (c), and black (BK) (each being 8 bits) generated by the image processing in the image processing section 3 are sent to the respective corresponding exposure units 41Y, 41M, 41C, 41BK, and 41H of the image forming section 4.

The exposure units 41Y, 41C, 41BK, and 41H carry out image exposure with laser light in correspondence to the respectively corresponding original coloring material tone data or the foam toner tone data.

Specifically, an unillustrated semiconductor laser is modulated in correspondence to the original reproduction coloring material tone data, and a laser light LB is emitted from the semiconductor laser in correspondence to the tone data. The laser light LB emitted from the semiconductor laser is deflected and scanned by an unillustrated rotating polygonal mirror, and scan-exposed via unillustrated an f/θ lens and a reflective mirror onto the photosensitive drums 42Y, 42M, 42C, 42BK, and 42H that serve as image carriers.

The photosensitive drums 42Y, 42M, 42C, 42BK, and 42H for which the laser light LB has been scan-exposed by the exposure units 41Y, 41M, 41C, 41BK, and 41H, are rotatingly driven at a predetermined speed along the directions of the arrows by unillustrated drive means.

After surfaces of the photosensitive drums 42Y, 42M, 42C, 42BK, and 42H have been charged in advance to a predetermined polarity (e.g., negative polarity) and potential by the Scorotrons (charge units) 43Y, 43M, 43C, 43BK, and 43H for primary charging, electrostatic images are formed thereon by the laser light LB being scan-exposed in correspondence to the original reproduction coloring material tone data.

After the surfaces of the photosensitive drums 42Y, 42M, 42C, 42BK, and 42H have been similarly charged to, e.g., −650 V, the laser light LB is scan-exposed at image portions and electrostatic latent images are formed in which exposed portions become −200 V.

The electrostatic latent images formed on the surfaces of the photosensitive drums 42Y, 42M, 42C, 42BK, and 42H are reverse-developed by the developing units 44Y, 44M, 44C, and 44BK of the four colors of yellow (Y), magenta (M), cyan (C), and black (BK) and the developing unit 42H for the foam toner, e.g., by the toners (charged coloring material) charged to same negative polarity as the charged polarity of the photosensitive drums 42Y, 42M, 42C, 42BK, and 42H, to thereby become toner images T of predetermined colors (including the foam toner).

At that time, a development bias voltage of, e.g., −500 V is applied to developer rolls of the respective developing units 44Y, 44M, 44C, 44BK, and 44H. It should be noted that the toner images T formed on the photosensitive drums 42Y, 42M, 42C, 42BK, and 42H receive as needed a charge of negative polarity by pretransfer charge units (not illustrated) to thereby adjust the electrical charge.

The toner images of the respective colors (including the foam toner) formed on the photosensitive drums 42Y, 42M, 42C, 42BK, and 42H are multiply transferred to the intermediate transfer belt 45 disposed below the photosensitive drums 42Y, 42M, 42C, 42BK, and 42H.

The intermediate transfer belt 45 is rotatably supported along the direction of the arrow by predetermined drive means at a movement speed that is identical to the peripheral speed of the photosensitive drums 42Y, 42M, 42C, 42BK, and 42H.

All or some of the toner images of the four colors of yellow (Y), magenta (M), cyan (C), and black (BK) formed on the photosensitive drums 42Y, 42M, 42C, 42BK, and 42H in correspondence to the colors of the image to be formed, and moreover the foam toner image formed on the photosensitive drum 42H in correspondence to the foam toner signal that forms the three-dimensional image, are transferred to the intermediate transfer belt 45 in a state in which they have been successively superposed.

The toner images T that have been transferred onto the intermediate transfer belt 45 are transferred onto the recording paper 48, which is conveyed at a predetermined timing, at the transfer unit 46 by a pressure contact force and an electrostatic suction force.

It should be noted that the recording paper 48 of a predetermined size is supplied by feed rolls from plural paper supply cassettes (not illustrated) disposed within the copying machine body that serve as recording medium housing members, and that the recording paper 48 is conveyed at a predetermined timing to a secondary transfer position (transfer unit 46) of the intermediate transfer belt 45 by plural conveyance rolls and registration rolls (not illustrated).

Additionally, in the transfer unit 46, the toner images of the predetermined colors are transferred all together to the recording paper 48 from the intermediate transfer belt 45.

After the recording paper 48, to which the toner images of the predetermined colors have been transferred from the intermediate transfer belt 45, has been separated from the intermediate transfer belt 45, it is sent to the fixing unit 47, where the toner images are fixed to the recording paper 48 by heat and pressure from heating rolls and pressure rolls of the fixing unit 47, and then discharged to outside of the copying machine body, and the process by which the color image is formed concludes.

It should be noted that, in addition to the developing units 44Y, 44M, 44C, and 44BK that respectively house toners of the four colors of yellow (Y), magenta (M), cyan (C), and black (BK), the image forming section 4 is also disposed with the foam toner developing unit 44H that houses a white color foaming toner including a foaming material.

In the developing process, the developing unit 44H develops the last toner image of the toner images that have been multiply transferred onto the intermediate transfer belt 45, i.e., the foam toner image transferred on the uppermost layer of the intermediate transfer belt 45.

Accordingly, when the toner images that have been multiply transferred to the intermediate transfer belt 45 have been transferred thereafter to the recording paper 48, the order of the multiple transfer toner images is reversed, and the foam toner image is transferred to the lowermost layer.

Thereafter, when the toner images that have been multiply transferred to the recording paper 48 are to be fixed by the fixing unit 47, the foam toner of the lowermost layer foams due to heat applied thereto at that time and becomes three dimensional.

Also, the toner images of the various colors multiply transferred onto the foam toner that has become three dimensional due to the foaming become color images corresponding to the number of toner colors at this time and are fixed. As a result, a three-dimensional color image, in which a color image (coloring material) is formed on a three-dimensional foam toner (three-dimensional material), is formed on the recording paper 48.

FIGS. 2A to 2G are conceptual cross-sectional structural diagrams of toner images for the purpose of describing the transfer and fixing process of the image forming apparatus pertaining to the invention.

Figure 2F:
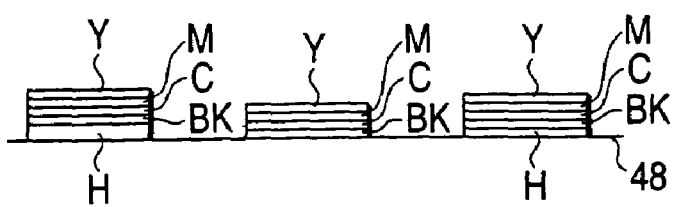
Figure 2G:
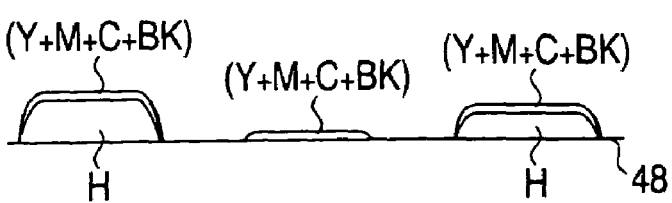

FIGS. 2A to 2E illustrate the primary transfer process, FIG. 2F illustrates the secondary transfer process, and FIG. 2G illustrates the fixing process. A, B, and C in FIGS. 2A to 2G respectively represent target pixels.

In FIG. 2A, pixel A is a pixel within the three-dimensional print designation region. With respect to this pixel A, the respective toner images of Y, M, C, BK, and H are successively multiply transferred onto the intermediate transfer belt 45 in the primary transfer process (FIGS. 2A to 2E), and then the multiply transferred toner layers are reversed and transferred to the recording paper 48 in the secondary transfer process (FIG. 2F), and the foam toner (H) of the lowermost layer foams and the respective color toners are melted and fixed thereon in the fixing process (FIG. 2G), whereby the three-dimensional color image is formed.

Pixel B is a pixel within the ordinary print designation region. With respect to this pixel B, the respective toner images of Y, M, C, and BK are successively multiply transferred onto the intermediate transfer belt 45 in the primary transfer process (FIGS. 2A to 2E), and then the multiply transferred toner layers are reversed and transferred to the recording paper 48 in the secondary transfer process (FIG. 2F), and the multiply transferred respective color toners are melted and fixed in the fixing process (FIG. 2G), whereby the ordinary (flat) color image is formed.

Pixel C is a pixel of an image region within the ordinary print designation region. With respect to this pixel C, the respective toner images of Y, M, C, BK, and H are successively multiply transferred onto the intermediate transfer belt 45 in the primary transfer process (FIGS. 2A to 2E), and then the multiply transferred toner layers are reversed and transferred to the recording paper 48 in the secondary transfer process (FIG. 2F), and the foam toner (H) of the lowermost layer foams and the respective color toners are melted and fixed thereon in the fixing process (FIG. 2G), whereby the three-dimensional color image is formed.

However, with respect to pixel C, the amount of foam toner transferred onto the recording paper 48 in the secondary transfer process of FIG. 2F is less in comparison with that of pixel A, and after the fixing process of FIG. 2G has concluded, pixel C is fixed as a three-dimensional color image of a height that is lower (thinner) than that of pixel A.

As will be understood from the process of FIGS. 2A to 2G, the image forming apparatus of the invention includes the function of forming an image by supplying a small amount of foam toner to pixels outside the three-dimensional print designation region (pixel C of the image region within the ordinary print designation region).

By devising such an apparatus, it becomes possible to secure excellent printing quality and to mitigate differences in coloration between an ordinary color image and a three-dimensional color image, in which there is a tendency for granularity to worsen in comparison with an ordinary color image, in an instance in which a case where a three-dimensional color image (pixel A) is to be formed using foam toner and a case where a flat ordinary color image (pixel B and pixel C) is to be formed are mixed, as exemplified, for example, in FIGS. 2A to 2G.

In this instance, it is preferable to adjust the amount of foam toner so that the height of the pixel within the ordinary print designation region (in the example of FIGS. 2A to 2G, particularly pixel C within the image region in the ordinary print designation region) is not as high as that of the pixel within the three-dimensional print designation region (in the example of FIGS. 2A to 2E, pixel A) and becomes a height that is not conspicuous as a three-dimensional image.

In the image forming apparatus pertaining to the invention, the function of adjusting the amount of foam toner in correspondence to each pixel can be realized by the following image processing.

Next, the image processing function in the image forming apparatus of the invention will be described.

Figure 3:
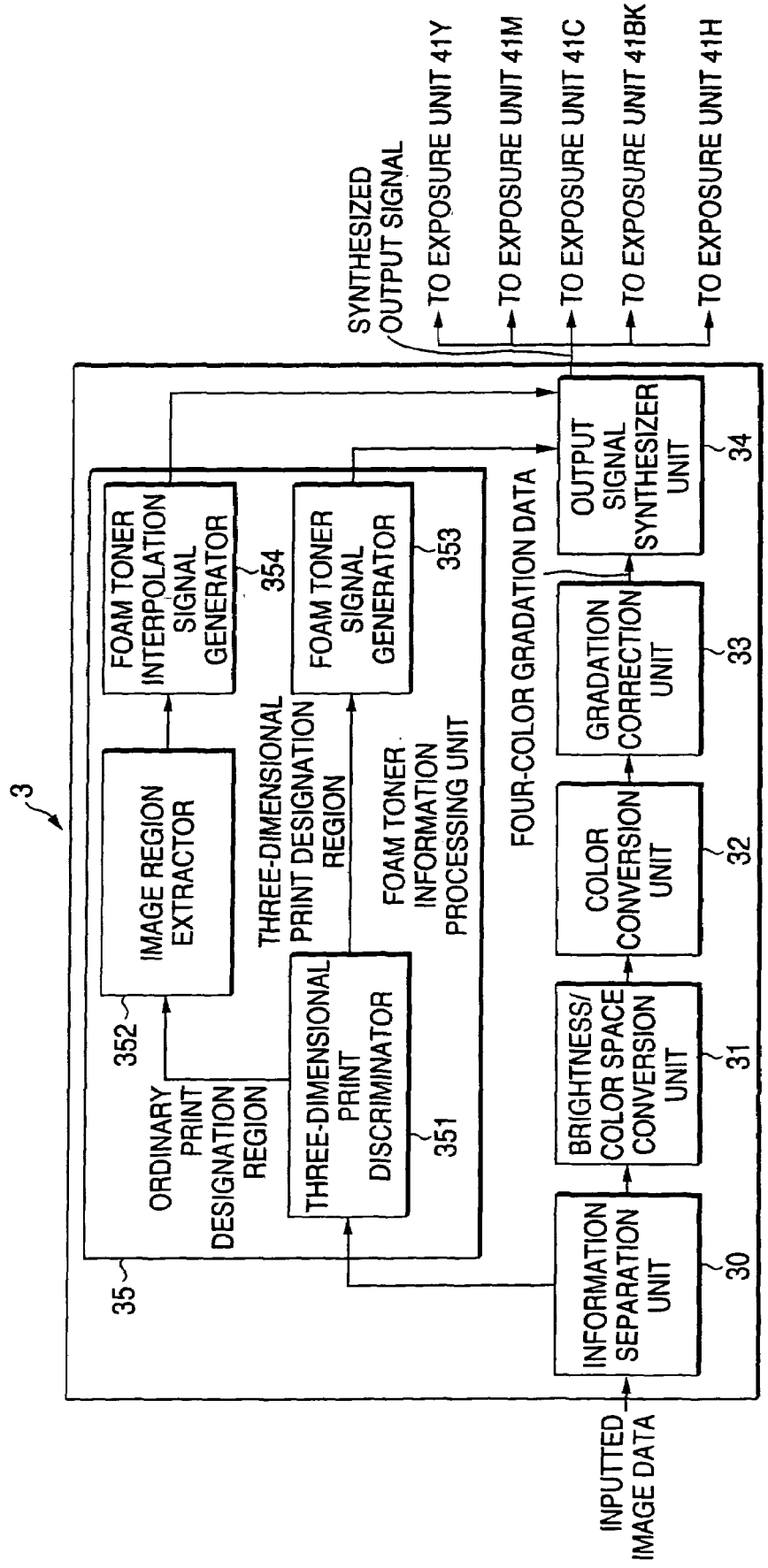
FIG. 3 is a block diagram illustrating the structure of an image processing section 3 pertaining to a first embodiment.

FIG. 3 is a block diagram illustrating the structure of the image processing section 3 pertaining to a first embodiment in the image forming apparatus of the invention.

The image processing section 3 is disposed with an information separation unit 30, a color space conversion unit 31, a color conversion unit 32, a tone correction unit 33, an output signal synthesizer unit 34, and a foam toner information processing unit 35.

The foam toner information processing unit 35 is structured by a three-dimensional print region discriminator 351, an image region extractor 352, a foam toner signal generator 353, and a foam toner interpolation signal generator 354.

In the image processing section 3, image data, in which foam toner information has been applied, by the foam toner information application section 2 in correspondence to the three-dimensional printing designation from the print region designation section 5, to the original reflectance data of the three colors of red (R), green (G), and blue (B) (each being 8 bits) read at the image reading section 1, is inputted into the information separation unit 30.

The information separation unit 30 separates the original reflectance data from the inputted image data and inputs the original reflectance data into the color space conversion unit 31, and inputs the foam toner information and the image information to the three-dimensional print region discriminator 351 of the foam toner information processing unit 35.

After the original reflectance data inputted into the color space conversion unit 31 has been converted to an L*a*b* signal at the color space conversion unit 31, it is color-converted at the color conversion unit 32, and tone-corrected at the tone correction unit 33, whereby it is generated as original coloring material tone data of the four colors of yellow (Y), magenta (M), cyan (C), and black (BK) (each being 8 bits) and sent to the output signal synthesizer unit 34.

It should be noted that the original coloring material tone data of these four colors may be generated using a DLUT (LUT for three-dimensional color conversion) from the L*a*b* signal.

The three-dimensional print region discriminator 351 references the foam toner information from the image information and the foam toner information inputted from the information separation unit 30, and discriminates whether the target pixel is a pixel within the three-dimensional print designation region (foam toner use region) or a pixel within the ordinary print designation region.

When the target pixel is discriminated to be a pixel within the three-dimensional print designation region, the three-dimensional print region discriminator 351 sends the foam toner information as it is to the foam toner signal generator 353.

The foam toner signal generator 353 generates a foam toner signal on the basis of the foam toner information inputted from the three-dimensional print region discriminator 351 and sends the foam toner signal to the output signal synthesizer unit 34.

The foam toner signal is a signal corresponding to the tone of the foam toner image (tone data of the color signal of the other four colors). The higher the gradient of the foam toner signal, the larger the amount of foam toner (amount per unit area) is made, whereby the height of the three-dimensional image can be increased.

In the present embodiment, the foam toner signal generated at the foam toner signal generation unit 33 on the basis of the inputted foam toner information (flag="1") is a signal having a gradient corresponding to a predetermined foam toner amount with which the three-dimensional image can be formed.

When the target pixel is discriminated to be a pixel within the ordinary print designation region, the three-dimensional print region discriminator 351 sends the image information of the pixel to the image region extractor 352.

The image region extractor 352 determines whether the target pixel belongs to a text portion or to an image portion (an image equal to or greater than a constant area) from the image information inputted from the three-dimensional print region discriminator 351. It should be noted that this determination can be implemented by applying a T/I separation algorithm in ordinary image processing.

In the determination, when the target pixel is determined to belong to a text portion (or an image portion that is smaller than the constant area), the image region extractor 352 instructs the foam toner interpolation signal generator 354 that the foam toner is not to be used (does not send a foam toner use signal described later).

When the target pixel is determined to belong to an image portion equal to or greater than the constant area, the image region extractor 352 sends a signal (foam toner use signal) to the foam toner interpolation signal generator 354 indicating that the foam toner is to be used.

The foam toner interpolation signal generator 354 generates a foam toner interpolation signal when the foam toner use signal is inputted from the image region extractor 352 and sends the foam toner interpolation signal to the output signal synthesizer unit 34.

Similar to the above-described foam toner signal, the foam toner interpolation signal is a signal corresponding to the tone of the foam toner image, but it is a signal whose gradient is lower than that of the foam toner signal. That is, when the foam toner interpolation signal is used, foam toner of a smaller amount (amount per unit area) than when the foam toner signal is used can be supplied through the exposure/development process, whereby it becomes possible to form a three-dimensional image of a height that is lower than that of the three-dimensional image formed on the basis of the foam toner signal.

The output signal synthesizer unit 34 synthesizes, at a corresponding pixel position, the foam toner signal generated at the foam toner signal generator 353 and the foam toner interpolation signal generated at the foam toner interpolation signal generator 354 with the original coloring material tone data of the four colors generated through the color space conversion unit 31, the color conversion unit 32, and the tone correction unit 33, and outputs the synthesized signal (print image data) to each of the corresponding exposure units 41Y, 41M, 41C, 41BK, and 41H.

Thereafter, at the image forming section 4 including these exposure units 41Y, 41M, 41C, 41BK, and 41H, the three-dimensional image disposed with the foam toner and the ordinary color image not disposed with the foam toner are printed on the recording paper 48 through the process shown in FIGS. 2A to 2G.

In the image forming apparatus of the invention, of the color images disposed with the foam toner, foam toner of an amount corresponding to the foam toner signal is disposed on the pixels within the three-dimensional print designation region through the above-described image processing and a three-dimensional image is formed, and foam toner of an amount (in which the amount per unit area is less than the amount corresponding to the foam toner signal) corresponding to the foam toner interpolation signal is disposed on the pixels of the image portion of the ordinary print designation region and a three-dimensional image of a height lower (thinner) than that of the image of the three-dimensional print region is formed.

It should be noted that, in the above-described image processing, signal processing in which the amount of foam toner becomes a minimum amount in regard to the image of the image portion within the ordinary print designation region is preferably administered, and it is necessary that the ordinary print designation region does not appear to be three dimensional when the image formed after fixing is seen.

Next, image information that is the target of image processing in the image forming apparatus of the invention and a specific example of print results thereof will be described.

Figure 4:
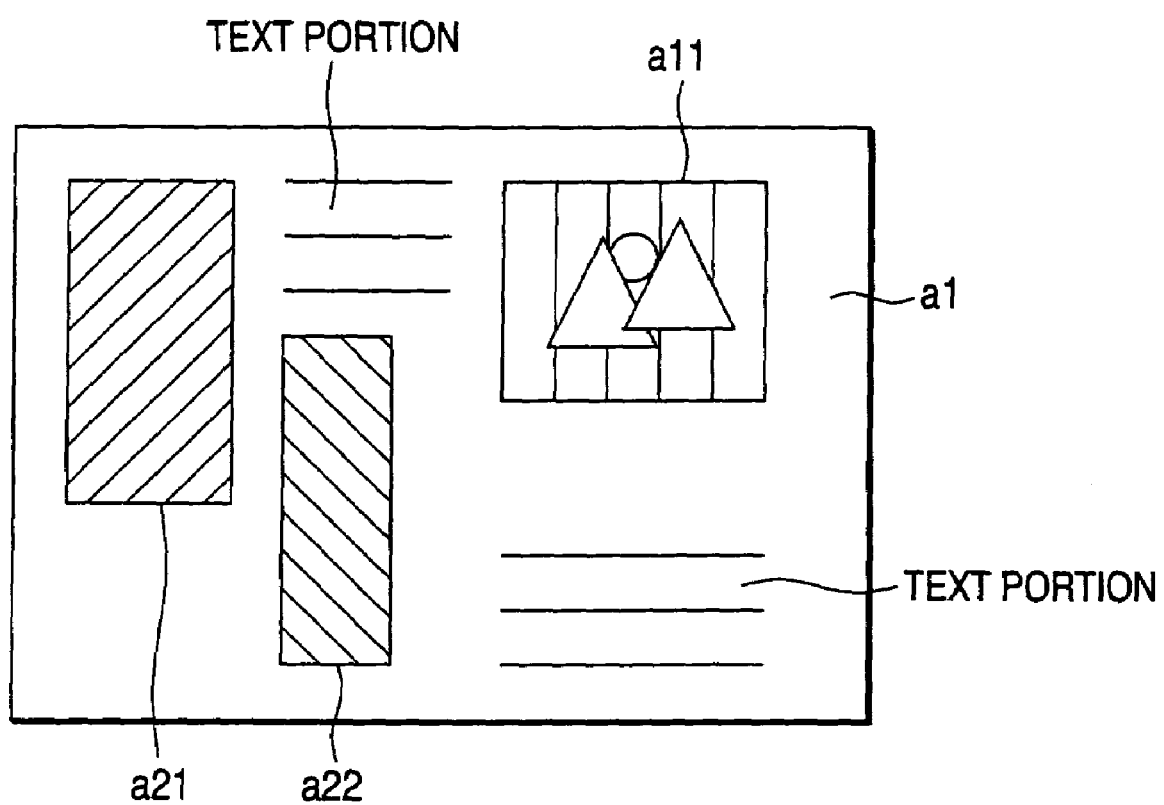
FIG. 4 is a view illustrating an example of image information that is a target for image processing.

FIG. 4 is a view illustrating an example of image information that is the target of image processing in the image forming apparatus of the invention.

In FIG. 4, a1 represents the ordinary print designation region, a11 represents the image region within the ordinary print designation region, and a21 and a22 represent the three-dimensional print designation regions.

When image information including regions for which the ordinary print designation and the three-dimensional print designation have been made is to be printed, with respect to the image data obtained by the image information being read at the image reading section 1, the foam toner information application section 2 applies the foam toner information to each pixel within the three-dimensional print designation regions a21 and a22 and inputs the foam toner information to the image processing section 3.

The image processing section 3 carries out processing that generates gradient data of the four colors of Y, M, C, and BK from the image data inputted from the image reading section 1, and carries out image processing in which it is discriminated from the foam toner information included in the inputted image data whether the target pixels are pixels within the three-dimensional print designation region or pixels within the ordinary print designation region, the foam toner signal is generated in which the foam toner information is used as it is with respect to pixels of the three-dimensional print designation region, image regions thereof are extracted with respect to the ordinary print designation region, the foam toner interpolation signal is generated for pixels of the image regions, and the foam toner signal and the foam toner interpolation signal are synthesized with the gradient data of the four colors and outputted.

Thereafter, in the image forming section 4, the three-dimensional color image disposed with the foam toner and the ordinary color image not disposed with the foam toner are printed on the recording paper 48 through the process shown in FIGS. 2A to 2G on the basis of the synthesized output signal from the image processing section 3.

Figure 5A:
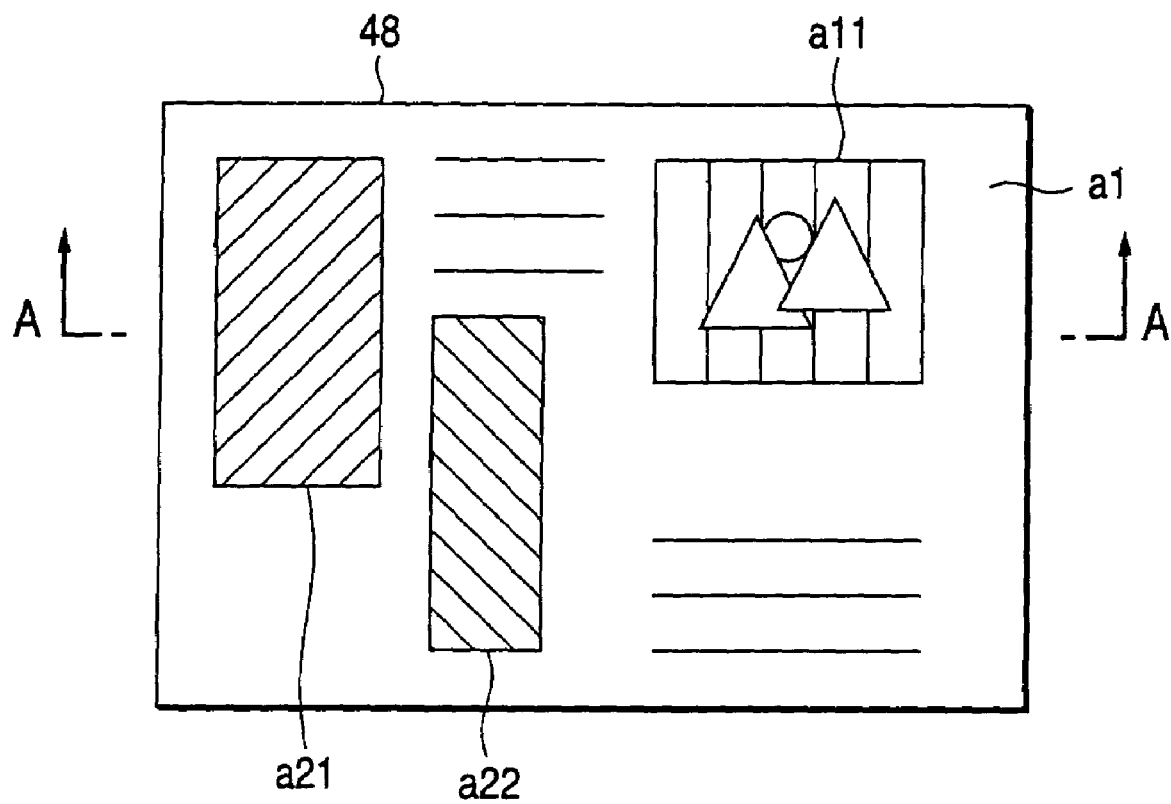
FIGS. 5A and 5B are views illustrating print results of the image information illustrated in FIG. 4.
Figure 5B:
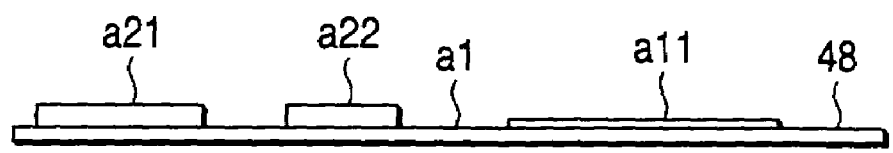

FIGS. 5A and 5B are views illustrating print results when the image information shown in FIG. 4 has been printed through the image processing. FIG. 5A illustrates a conceptual cross-sectional structure along line A—A of FIG. 5A.

As will be understood from FIGS. 5A and 5B, the electrostatic latent image formed on the photosensitive drum 42H in the exposure process based on the foam toner signal is developed from the development unit 44H. Thereafter, the foam toner, for which primary transfer to the intermediate transfer belt 45 and secondary transfer from the intermediate transfer belt 45 to the recording paper 48 have been effected, becomes the base, and the images within the three-dimensional print designation regions a21 and a22 become three-dimensional images, due to the foam toner of the base foaming when the recording paper 48 passes through the fixing unit 47, and are printed on the recording paper 48.

Also, the electrostatic latent image formed on the photosensitive drum 42H in the exposure process based on the foam toner interpolation signal is developed from the development unit 44H. Thereafter, the foam toner, for which primary transfer to the intermediate transfer belt 45 and secondary transfer from the intermediate transfer belt 45 to the recording paper 48 have been effected, becomes the base, and the image of the image region a11 in the ordinary print designation region a1 becomes a three-dimensional image of a lower height, due to the foam toner of the base foaming when the recording paper 48 passes through the fixing unit 47, and is printed on the recording paper 48.

As will be understood from FIG. 5B, which illustrates the cross-sectional structure of the print results, foam toner of an amount that is less (has a lower height) per unit area than that at the base portion of the three-dimensional images within the three-dimensional print designation regions a21 and a22 is disposed at the base portion of the image within the image region all in the ordinary print designation region a1.

In FIG. 5B, no foam toner is disposed at the base portion of images such as text regions of the ordinary print designation region al other than the image region a11, and an ordinary (flat) color image is formed.

Thus, the invention is configured so that, even if the region is an ordinary print designation region (a1), foam toner of an amount (amount per unit area) that is smaller than that of an image within a three-dimensional print designation region (a21, a22) is disposed at an image region (a11) having a constant area in the ordinary print designation region.

As a result, a foam toner image of an inconspicuous amount is formed even with respect to an image that occupies a constant area within an ordinary print designated region, gloss and color reproduction characteristics close to an image of a three-dimensional print designation region comprising a foam toner image of an amount that is three-dimensionally conspicuous are presented, and overall images coincide even in a print in which ordinary print regions and three-dimensional print regions are mixed, whereby image quality becomes excellent.

It should be noted that, in the image forming apparatus of the invention, the arrangement of the foam toner may be appropriately configured in a case where a foam toner image is formed at an image region equal to or greater than the constant area within the ordinary print designation region.

As an example of a method of arranging the foam toner in this case, there is a method in which the foam toner is randomly distributed in the target image region within the ordinary print designation region.

There is also a method in which the foam toner is distributed in a screen-like manner in a uniform pattern in the target image region within the ordinary print designation region.

Figure 6:
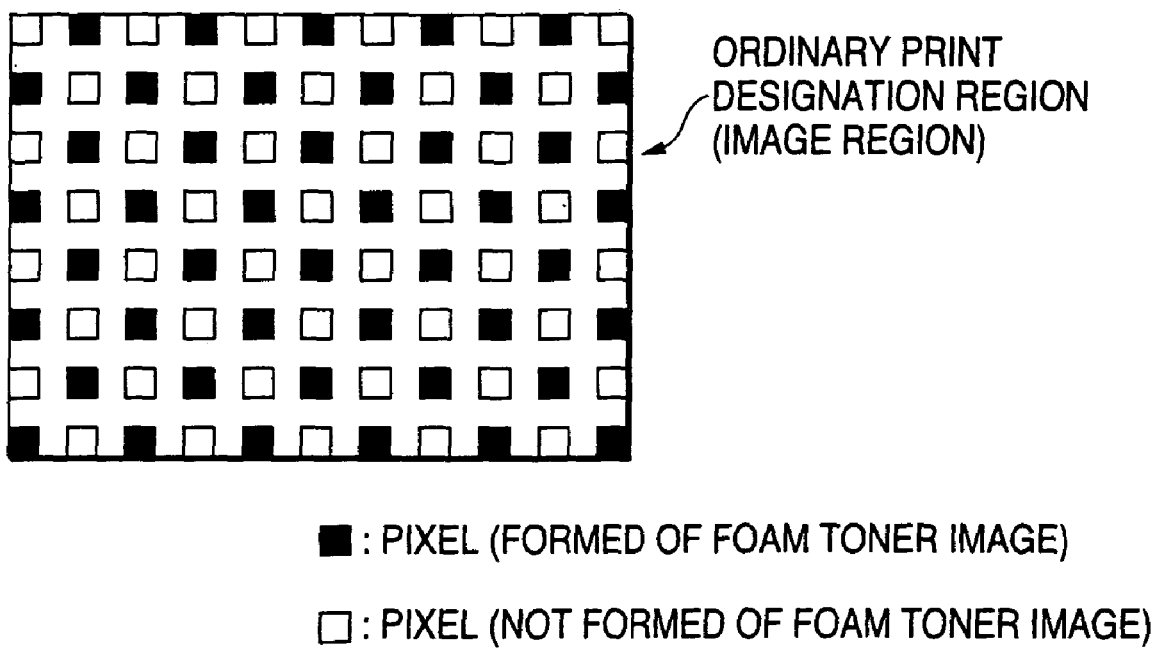
FIG. 6 is a view illustrating an example of a distribution pattern of foam toner.

FIG. 6 is a view illustrating an example of a distribution pattern in the case where the foam toner with respect to an image region equal to or greater than the constant area within the ordinary print designation region is distributed in a screen-like manner. In the example of FIG. 6, the distribution pattern is one in which pixels forming the foam toner image and pixels not forming the foam toner image alternately arise in the target image region.

Another screen-like foam toner distribution pattern other than the example shown in FIG. 6 may be optionally selected. However, in that case, it is preferable to adjust the foam toner interpolation signal so that the amount of foam toner becomes a minimum limit and to configure the distribution pattern so that the ordinary print region does not appear to be three-dimensional visually.

In the above-described embodiment, the foam toner is distributed by the image region equal to or greater than the constant area in the ordinary print designation region being extracted at the image region extractor 352 of the image processing section 3 (see FIG. 3). However, as another embodiment (a second embodiment), it is also possible to form a foam toner image of a small amount at the entire surface of an image on the recording paper 48 corresponding to print image information.

In this case, image processing of the print image information may be carried out so that the amount of foam toner transferred to the entire surface of the image is varied between the case where the three-dimensional print region is designated by the print region designation section 5 and the case where the three-dimensional print region is not designated by the print region designation section 5.

Figure 7:
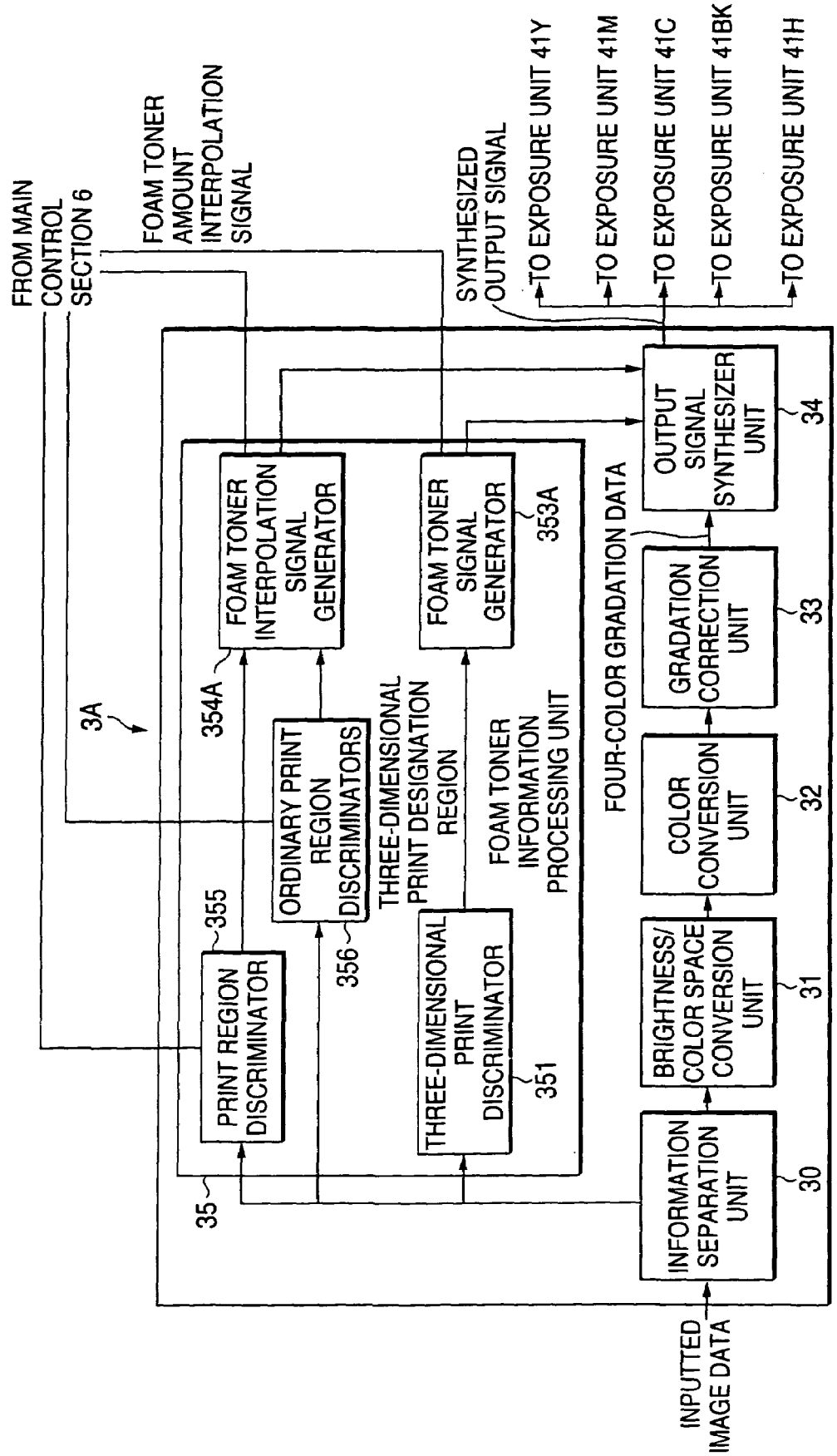
FIG. 7 is a block diagram illustrating the structure of an image processing section pertaining to a second embodiment.

FIG. 7 is a block diagram illustrating the structure of an image processing section 3A pertaining to the second embodiment. In the image processing section 3A, identical reference numerals will be given to parts having effects that are identical to those of parts in the image processing section 3 (see FIG. 3) pertaining to the first embodiment.

In the image processing section 3A, structures other than the foam toner information processing unit 35 are the same as those in the image processing section 3 pertaining to the first embodiment.

The foam toner information processing unit 35 of the image processing section 3A comprises: the three-dimensional print region discriminator 351, which discriminates from the inputted image signal whether or not the target pixel is a pixel of the three-dimensional print designation region; a foam toner signal generator 353A, which generates a foam toner signal that determines foam toner amount with respect to an image of an three-dimensional print designation region; a foam toner interpolation signal generator 354A, which generates a foam toner interpolation signal that determines foam toner amount with respect to an image of an ordinary print designation region or an entire print region; a print region discriminator 355, which discriminates an entire print region; and an ordinary print region discriminator 356, which discriminates an ordinary print region.

Functions are given to the foam toner signal generator 353A and the foam toner interpolation signal generator 354A to respectively correct the foam toner signal and the foam toner interpolation signal on the basis of a foam toner amount correction signal sent from the main control section 6 on the basis of the ordinary print/three-dimensional print regions designation from the print region designation section 5, so that the amount of foam toner can be varied.

Also, one of the print region discriminator 355 and the ordinary print region discriminator 356 is driven by, for example, a selection drive signal from the main control section 6.

In the image processing section 3A, at the time of selected driving of the print region discriminator 355, a foam toner interpolation signal for supplying a foam toner amount of a predetermined amount is generated by the foam toner interpolation signal generator 354A with respect to pixels of the entire print region discriminated by the print region discriminator 355.

Also, at the time of selected driving of the ordinary print region discriminator 356, a foam toner interpolation signal for supplying a foam toner amount of a predetermined amount is generated by the foam toner interpolation signal generator 354A with respect to pixels of the ordinary print region discriminated by the ordinary print region discriminator 356.

Additionally, a foam toner signal for supplying a foam toner amount greater than the amount of foam toner corresponding to the foam toner interpolation signal is generated by the foam toner signal generator 353A with respect to pixels of the region discriminated by the three-dimensional print region discriminator 351 to be within a three-dimensional print designation region.

The foam toner signal and the foam toner interpolation signal are synthesized at the output signal synthesizer unit 31 with four color tone data. Thereafter, the processes by which foam toner of amounts corresponding to the respective signals is supplied on the basis of the foam toner signal and the foam toner interpolation signal to a three-dimensional image corresponding to the amount of foam toner in the image forming section 4 are the same as those in the above-described embodiment.

In the image forming apparatus disposed with the image processing section 3A, it is possible to realize various prints such as those indicated below by, for example, sending the foam toner interpolation signal from the main control section 6 to the foam toner signal generator 353A and the foam toner interpolation signal generator 354A on the basis of the ordinary print/three-dimensional print regions designation from the print region designation section 5 and by respectively correcting, at the foam toner signal generator 353A and the foam toner interpolation signal generator 354A, the foam toner signal and the foam toner interpolation signal on the basis of the foam toner amount correction signal, so that the amount of foam toner can be varied.

FIGS. 8A to 8D are conceptual cross-sectional structural views illustrating various examples of print results based on print image information that has been image-processed by the image processing section 3A.

Figure 8A:
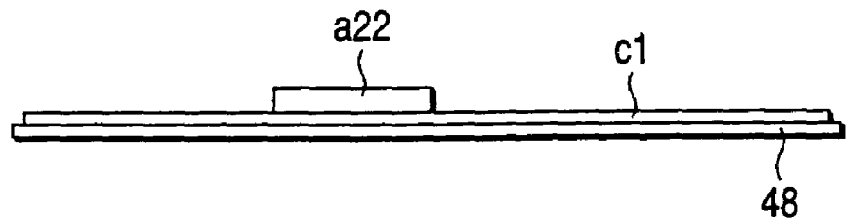
FIGS. 8A to 8D are conceptual cross-sectional structural diagrams illustrating print results based on image processing in the second embodiment.

FIG. 8A illustrates a print example in which foam toner has been thinly transferred to an entire surface of an image (c1) of the recording paper 48 corresponding to the print image information.

Figure 8B:
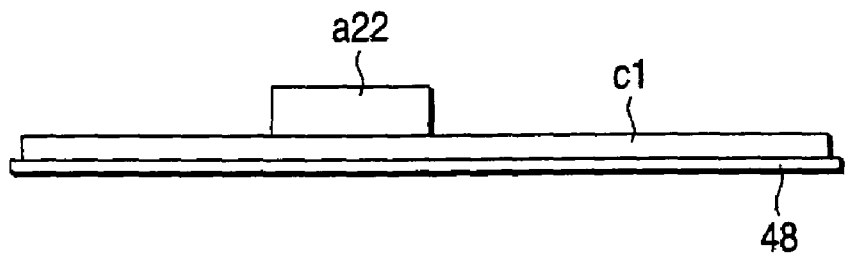

FIG. 8B illustrates an example in which foam toner has been thinly transferred to the entire surface of the image (c1) of the recording paper 48 corresponding to the print image information, foam toner of an amount greater than the foam toner disposed on the entire surface of the image is transferred to an image within the three-dimensional print designation region a22, and the image of the three-dimensional print region a22 is made into a three-dimensional image.

In this case, due to the three-dimensional print region being designated, the amount of foam toner transferred to the entire surface of the image (c1) is corrected to an amount that is larger than when the three-dimensional print region is not designated (FIG. 8B).

It should be noted that, although the amount of foam toner transferred to the entire surface of the image (c1) is varied in these examples when the three-dimensional print region has been designated, the amount of foam toner transferred to the entire surface of the image (c1) may be made constant and the amount of foam toner transferred to the three-dimensional print region a22 may be increased, or the amount of foam toner transferred to the entire surface of the image (c1) and the three-dimensional print region a22 may be varied at a constant ratio.

Figure 8C:
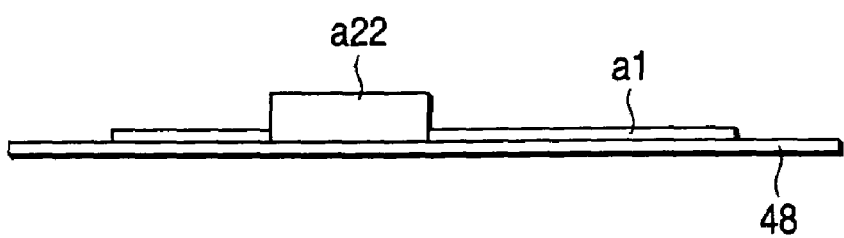

FIG. 8C illustrates a print example in which foam toner is transferred not only to the three-dimensional print region a22 but also to the ordinary print designation region a1 in a case where the ordinary print designation region a1 and the three-dimensional print designation region a22 are mixed.

In this instance, the amount of foam toner of the ordinary print designation region a1 is a constant amount of a small amount, and the amount of foam toner of the three-dimensional print designation region a22 is an amount (an amount larger than the constant amount) corresponding to the image of the region a22.

As a modified example of the print example of FIG. 8C, the amount of foam toner of the three-dimensional print designation region a22 may be increased at a constant ratio in a case where foam toner is also transferred to the ordinary print designation region a1 when the ordinary print designation region a1 and the three-dimensional print designation region a22 are mixed.

By implementing such processing, it is possible to eliminate differences between the ordinary print designation region and the three-dimensional print designation region from becoming inconspicuous.

It should be noted that, in the print example shown in FIGS. 5A and 5B, the processing can also be applied to a case where a small amount of foam toner is supplied to the image region a11 in the ordinary print region a1.

Generally, when a three-dimensional print designation region (e.g., a22) and the image region a11 in the ordinary print designation region a1 are adjacent, differences with the image region a11 disposed with the small amount of foam toner in the ordinary print region a1 become inconspicuous due to the amount of foam toner of the three-dimensional print designation region a22. Thus, it is very useful in terms of improving print quality to give consideration to the spatial distribution of these and to correct the amount of foam toner by increasing the amount (foam toner signal) of the foam toner with respect to the three-dimensional print region.

Figure 8D:
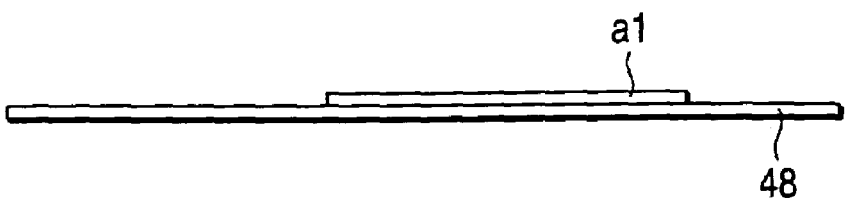

FIG. 8D illustrates a print example in which foam toner of a predetermined amount is transferred to the entire surface of the ordinary print designation region in a case where the ordinary print region has been designated.

In this manner, in the image forming apparatus of the invention, in order to avoid coloration different between the case where an ordinary flat color image is formed on the recording paper 48 and the case where a color image is formed on the foam toner, foam toner is thinly formed with respect to a predetermined region (region at which a color image is to be formed or the entire surface of a recording paper), whereby differences in coloration are eliminated. In this case, the image is made three-dimensional by thinly forming the foam toner at a region that is to be foamed.

In the invention, by implementing the above-described image processing, color reproduction characteristics and granularity that are extremely close between regions thinly disposed with foam toner and three-dimensional regions thickly disposed with foam toner are provided, overall images coincide, and excellent image quality can be obtained.

Also, according to the image processing of the invention, by forming foam toner below the color image, excellent coloration characteristics can be expected regardless of the whiteness of the recording paper, i.e., with the paper of poor quality.

Also, because light transmittance becomes lower due to the foaming of the foam toner, coloration characteristics are better than they are when white color toner is formed below the color image.

It should be noted that the invention is not limited to the embodiments described above and illustrated in the drawings, and can be appropriately modified and implemented within a range in which the gist thereof is not altered.

For example, in the above-described embodiments, when the three-dimensional material (foam toner) is formed at both of the three-dimensional print region and the ordinary print region (non-three-dimensional print region), the three-dimensional material of the three-dimensional print region forms an image in which the amount per unit area becomes larger in comparison with the three-dimensional material of the non-three-dimensional print region. However, an image may be formed at the non-three-dimensional region by the three-dimensional material of a predetermined amount per unit area, and an image may be formed at the three-dimensional print region by the three-dimensional material of an amount corresponding to image information.

Also, in relation to the realization of the print region designation section 5, it is also to possible to dispose a user interface (UI) and add a function in which a user can instruct the three-dimensional print region or the ordinary print designation region. Also, selection means may be disposed with which it is possible to select that the foam toner not be disposed with respect to ordinary print portions.

For example, a structure is conceivable in which a region designation mode screen is displayed on an operation screen of an input operation section (not illustrated) of the image forming apparatus in FIG. 3, attributes (image portions, borders, text portions, etc.) of regions that are to be three-dimensionally printed are selected on the screen, and the attribute information is inputted into the foam toner information application section 2.

In this case, the foam toner information application section 2 can be realized with a functional structure in which a region matching the attributes is extracted from the original reflectance data inputted from the image reading section 1 and the foam toner information is applied to pixels within the region.

It is also possible to configure a structure in which an external interface is disposed at the image forming apparatus of the invention, image data is inputted via the external interface from an external device such as a digital camera or an information processing terminal (personal computer), the image data is image-processed, and an image including a three-dimensional image resulting from the foam toner is printed.

Particularly in a case where image data imported from a personal computer is printed, as a print region designation function corresponding to the print region designation section 5, a target image for printing may be displayed on a display screen of the personal computer, and the region to be three-dimensionally printed within the image may be designated using an input device such as a keyboard or a mouse.

In this case, the foam toner information application section 2 can be realized with a functional structure in which pixels within the region designated as the three-dimensional print region are extracted from image data inputted from the personal computer, and the foam toner information is applied to the pixels.

Also, in the above-described embodiments, the image forming apparatus was described under the assumption that the image forming apparatus was a copying machine. However the image forming apparatus pertaining to the invention can also be applied to a printer or the like. The structure of the printer in this case can be realized by, for example, omitting the image reading section 1 from the image forming apparatus (copying machine) in FIG. 1 and disposing in its place an interface function to import image data from an information processing terminal such as a personal computer.

As described above, according to the invention, when a non-three-dimensional print region and a three-dimensional print region using a three-dimensional material are separately designated with respect to image information and the three-dimensional material is to be formed at both of the non-three-dimensional print region and the three-dimensional print region, because the three-dimensional material of the three-dimensional print region forms an image in which the amount per unit area becomes larger in comparison with the three-dimensional material of the non-three-dimensional print region, a foam toner image of an inconspicuous amount is also formed at the non-three-dimensional print region, granularity and color reproduction characteristics close to the three-dimensional print are provided, and it is possible to obtain excellent image quality in which there are not many differences in coloration and the like even in a case where an ordinary print and a three-dimensional print are mixed.

What is claimed is:

1. An image forming apparatus that forms a three-dimensional print image by forming a first image with a three-dimensional material on a recording medium in correspondence to image information and forming a second image on the first image with a coloring material, the apparatus comprising:
   a designation unit that designates, with respect to the image information, a distinction between an ordinary print region and a three-dimensional print region using the three-dimensional material; and
   an image forming unit that forms, when the three-dimensional material is to be formed at both of the ordinary print region and the three-dimensional print region designated by the designation unit, the print image in which the amount per unit area of the three-dimensional material of the three-dimensional print region becomes larger in comparison with the three-dimensional material of the ordinary print region.

2. An image forming apparatus that forms a three-dimensional print image by forming a first image with a three-dimensional material on a recording medium in correspondence to image information and forming a second image on the first image with a coloring material, the apparatus comprising:
   a designation unit that designates, with respect to the image information, a distinction between an ordinary print region and a three-dimensional print region using the three-dimensional material; and
   an image forming unit that forms, at the ordinary print region designated by the designation unit, the print image with the three-dimensional material of a predetermined amount per unit area, and forms, at the three-dimensional print region, an image with the three-dimensional material of an amount corresponding to the image information.

3. The image forming apparatus of claim 1, wherein the ordinary print region is an entire surface of a region at which an image is formable on the recording medium.

4. An image processing apparatus that processes image information in order to form a three-dimensional print image by forming a first image with a three-dimensional material on a recording medium and forming a second image on the first image with a coloring material, the apparatus comprising:
   an image processing unit for carrying out image processing of the image information such that, when the three-dimensional material is to be formed at both of an ordinary print region and a three-dimensional print region in correspondence to a designation of the ordinary print region and the three-dimensional print region with respect to the image information, the amount per unit area of the three-dimensional material of the three-dimensional print region becomes larger in comparison with the three-dimensional material of the ordinary print region.

5. An image processing apparatus that processes image information in order to form a three-dimensional print image by forming a first image with a three-dimensional material on a recording medium and forming a second image on the first image with a coloring material, the apparatus comprising:
   an image processing unit for carrying out image processing of the image information such that, in correspondence to a designation of an ordinary print region and a three-dimensional print region with respect to the image information, the print image is formed at the ordinary print region with the three-dimensional material of a predetermined amount per unit area and the print image is formed at the three-dimensional print region with the three-dimensional material of an amount corresponding to the image information.

6. The image forming apparatus of claim 4, wherein the ordinary print region is an entire surface of a region at which an image is formable on the recording medium.

7. An image forming method that forms a three-dimensional print image by forming a first image with a three-dimensional material on a recording medium in correspondence to image information and forming a second image on the first image with a coloring material, the method comprising:
   designating, with respect to the image information, a distinction between an ordinary print region and a three-dimensional print region using the three-dimensional material; and
   forming, when the three-dimensional material is to be formed at both of the ordinary print region and the three-dimensional print region, the print image in which the amount per unit area of the three-dimensional material of the three-dimensional print region becomes larger in comparison with the three-dimensional material of the ordinary print region.

8. An image forming method that forms a three-dimensional print image by forming a first image with a three-dimensional material on a recording medium in correspondence to image information and forming a second image on the first image with a coloring material, the method comprising:
   designating, with respect to the image information, a distinction between an ordinary print region and a three-dimensional print region using the three-dimensional material; and
   forming, at the ordinary print region, the print image with the three-dimensional material of a predetermined amount per unit area, and forming, at the three-dimensional print region, the print image with the three-dimensional material of an amount corresponding to the image information.

9. The image forming method of claim 7, wherein the ordinary print region is an entire surface of a region at which an image is formable on the recording medium.

10. An image processing method that processes image information in order to form a three-dimensional print image by forming a first image with a three-dimensional material on a recording medium and forming a second image on the first image with a coloring material, the method comprising:
   designating a distinction between an ordinary print region and a three-dimensional print region with respect to the image information; and
   carrying out image processing of the image information such that, when the three-dimensional material is to be formed at both of the ordinary print region and the three-dimensional print region, the amount per unit area of the three-dimensional material of the three-dimensional print region becomes larger in comparison with the three-dimensional material of the ordinary print region.

11. An image processing method that processes image information in order to form a three-dimensional print image by forming a first image with a three-dimensional material on a recording medium and forming a second image on the first image with a coloring material, the method comprising:
   designating a distinction between an ordinary print region and a three-dimensional print region; and
   carrying out image processing of the image information such that the print image is formed at the ordinary print region with the three-dimensional material of a predetermined amount per unit area and the print image is formed at the three-dimensional print region with the three-dimensional material of an amount corresponding to the image information.

12. The image forming method of claim 10, wherein the ordinary print region is an entire surface of a region at which an image is formable on the recording medium.

13. A recording medium, on which an image resulting from a foam toner is formed, with an image resulting from a coloring material being formed on said image resulting from the foam toner, wherein
   said image resulting from the foam toner is formed on an entire surface of the recording medium,
   said image resulting from the foam toner includes at least two regions, the two regions being a first region, in which an amount of the foam toner per unit area is a first amount, and a second region, in which an amount of the foam toner per unit area is a second amount that is less that the first amount, and
   the image resulting from the coloring material is at least formed at the first region.

* * * * *